(12) United States Patent
Boulas et al.

(10) Patent No.: US 7,726,806 B2
(45) Date of Patent: Jun. 1, 2010

(54) WIDE ARMED SPECTACLES

(75) Inventors: Alain Boulas, La Celle sur Morin (FR); Laurent Adam, Malzeville (FR)

(73) Assignee: Chamborelle, Cregy les Meaux (FR)

( * ) Notice: Subject to any disclaimer, the term of this patent is extended or adjusted under 35 U.S.C. 154(b) by 0 days.

(21) Appl. No.: 12/308,835

(22) PCT Filed: Jan. 8, 2008

(86) PCT No.: PCT/FR2008/050024
§ 371 (c)(1),
(2), (4) Date: Dec. 23, 2008

(87) PCT Pub. No.: WO2008/107574
PCT Pub. Date: Sep. 12, 2008

(65) Prior Publication Data
US 2009/0303429 A1    Dec. 10, 2009

(30) Foreign Application Priority Data

| Feb. 2, 2007 | (FR) | ................................... | 07 53033 |
| May 3, 2007 | (FR) | ................................... | 07 54829 |
| Jul. 2, 2007 | (FR) | ................................... | 07 56203 |
| Dec. 4, 2007 | (FR) | ................................... | 07 59554 |

(51) Int. Cl.
*G02C 11/02*    (2006.01)

(52) U.S. Cl. .......................................... 351/52; 351/51
(58) Field of Classification Search ................... 351/52, 351/51, 121, 111, 41, 158
See application file for complete search history.

(56) References Cited

U.S. PATENT DOCUMENTS

| 4,665,598 | A | 5/1987 | Murai |
| 4,806,008 | A | 2/1989 | Tarloff |
| 4,877,320 | A | 10/1989 | Holden |
| 5,033,836 | A | 7/1991 | Aoyama |
| 6,036,309 | A | 3/2000 | Liu et al. |
| 7,261,409 | B1 * | 8/2007 | Taber .......................... 351/52 |
| 7,585,069 | B2 * | 9/2009 | Wilson ......................... 351/52 |

FOREIGN PATENT DOCUMENTS

| FR | 977201 | A | 3/1951 |
| FR | 1593159 | A | 5/1970 |
| FR | 2547430 | A3 | 12/1984 |

* cited by examiner

*Primary Examiner*—Hung X Dang
(74) *Attorney, Agent, or Firm*—Drinker Biddle & Reath LLP (57) ABSTRACT

Spectacles with wide side-pieces, at least one of the side-pieces of which has an opening. The inner face of the side-piece has fixing elements bordering the opening and a trim having a shape at least partly equal to the opening of the side-piece is equipped with fixing devices complementary to the fixing elements in order to fix the trim detachably to the side-piece.

14 Claims, 8 Drawing Sheets

WIDE ARMED SPECTACLES

FIELD OF THE INVENTION

The present invention concerns spectacles with wide side-pieces, at least one of the side-pieces of which has an opening.

STATE OF THE ART

There are at present numerous forms of spectacles with wide side-pieces. Although some side-pieces are wide and solid, there are others, opened up so that they are in the shape of a recumbent Y, the two arms of which are connected at the front of the side-piece by a cross-member carrying the hinge, in order to rejoin each other at the rear through the end of the side-piece fitting on the ear.

AIM OF THE INVENTION

The aim of the present invention is to develop spectacles in which the side-pieces can be adapted and made to harmonize with items of clothing or fashion trends.

EXPLANATION AND ADVANTAGES OF THE INVENTION

To this end, the invention concerns spectacles with wide side-pieces of the type defined above, characterized in that the inner face of the side-piece has fixing elements bordering the opening, and a decorative trim having a shape at least partly equal to that of the opening of the side-piece is equipped with fixing devices complementary to the fixing elements in order to fix the trim detachably to the side-piece.

The decorative trim which at least partially occupies the opening of the side-piece, on its inner face, i.e. the face of the side-piece turned towards the head of the user, appears through the opening and permits very varied aesthetic effects. Since the fixing of the trim is detachable, it can easily be replaced by a trim of another shape or of another design. The design in the part of the trim appearing in the opening of the side-piece may be a flat or relief design, colored or monochrome. The trim or that combined with one of the side-pieces of the spectacles advantageously includes electronic and information technology means such as a radio circuit, a telephone circuit or, more generally, link means capable of co-operating by WIFI.

Advantageously, the trim incorporates an electronic chip or an RFID badge to permit the identification of the wearer of the spectacles, for example a badge for access to a protected-zone such as an office zone, a zone in a company, or for detection of passage, the authorization to use an installation or a machine, facilitating the management of the surveillance for the spectacle wearer who will not need to worry about a badge. The badge itself, of standard format, may be incorporated in a reserved area of standard format provided in the trim which is itself adapted particularly to a certain pair of spectacles.

Finally, the trims may be diversified, and the user of a pair of spectacles may have available a set of trims, renewable if necessary, according to choice or to need.

Since the trim is a planar structure, it does not interfere with the wearing of the spectacles and does not constitute an obstacle projecting from the inner face side of the side-pieces.

Although the trim may be opaque or transparent with patterns, encrustations, inserts or other decorative elements intended to appear in the opening or in one of the openings if the side-piece has a plurality of openings, it is advantageous for the trim to cover all of the opening and its dimensions are preferably such that the trim, when installed against the inner face of the side-piece, comes substantially to the level of the upper edge and of the lower edge of the side-piece.

The opening may be elongate in shape, and in this case the trim will also be elongate in shape. This elongate shape may be a triangular shape or a trapezoid shape, so as to leave, of the side-piece of the spectacles, only a strip at its upper edge and a strip at its lower edge, the two strips rejoining each other towards the rear through the end of the side-piece which fits on the ear.

The fixing elements carried by the side-piece and the fixing devices of the trim are preferably clipping-in means. Since the overall shape of the side-piece is triangular, it is advantageous to position the clipping-in means at the three vertices of this triangular shape, two means at the hinge at the front of the side-piece and one fixing means at the rear, where the wide side-piece reassumes a customary shape. The fixing means at the rear may advantageously be duplicated in the longitudinal direction of the trim and of the side-piece.

The clipping-in pins are for example fixed to the trim by welding. They may also be formed by pins forcibly engaged in the trim. These fixing means, preferably resilient, easily engage in the orifices provided in the side-piece and forming the fixing elements there. The orifices are preferably not of the through type. However, for fixing reasons or aesthetic reasons it may be advantageous to provide through orifices and for the clipping-in pins to have a length enabling them to appear on the other face of the side-piece and even to go beyond it. This structure is advantageous not only for providing adequate fixing while remaining detachable, but also owing to its decorative effect due to the appearance of the ends of the pins. If the trim and the pins are made of metal, for example a polished or gilded metal, the pins themselves will appear with their end at the outlet of the orifices forming the fixing elements in the wide side-piece.

It is also advantageous for the fixing elements to be formed by two curved lugs, at the front of the side-piece on the hinge side, the lugs being directed towards the rear of the side-piece, and by a seating at the rear, and for the fixing devices to be formed by a tongue engaging longitudinally in the seating of the side-piece, and by the front edge of the trim which slides beneath the lugs curved towards the rear.

The trim is then installed by acting on the flexibility of the trim since, after having engaged the tongue-like end of the fixing device of the trim in the seating at the rear of the side-piece, which seating is formed for example by a kind of loop or rider, optionally of the through type, it is sufficient to arch the trim in order to slide it beneath the curved lugs at the front of the side-piece.

The trim is advantageously held in place by a cutaway portion intended to fit on the hinge member carried by the side-piece, the curved lugs or the fixing elements such as the clipping-in orifices being located on either side of the hinge member. This retains or blocks the trim in the direction perpendicular to the longitudinal direction of the side-piece, in the plane of the side-piece.

According to another feature, the inner face of the side-piece carries fixing elements in the form of two bearings aligned on each side of the opening, as well as a clipping-in element not located on the axis of the two bearings, bordering the opening, the trim is equipped with fixing devices formed by two pivots aligned at each end of the trim, and a clipping-in device forming the third fixing point in order to co-operate with the clipping-in element of the side-piece.

This method of fixing the trim to the side-piece of the spectacles is of advantage since it is easy to install and without risk of detachment, since the trim is engaged by its two axes in the bearing and a third point of the trim is fixed by clipping. Even if the trim disengages itself from the clipping element where it is clipped, it cannot disengage itself from the bearings except by being deformed. This deformation of the trim by arching to reduce the distance between the axes occurs at the moment of installation of the trim. The deformation is simple to carry out, since it is possible to hold it with one hand, engage a pivot in its bearing, then arch the trim and engage the second pivot in its bearing, since when the trim is straightened out, it can pivot about the axis thus formed in order to be clipped in.

But this arching movement, which must also be carried out in order to disengage the trim and replace it with another trim, is not a deformation which is likely to occur naturally if the side-piece catches accidentally on an object.

This type of trim and fixing method for the trim is particularly advantageous for high value trims, for example trims decorated with items of jewelry such as stones, gilding or the like.

Advantageously, one of the pivots is carried by a lug disengaged from the body of the trim to which it remains connected by a strip of material forming a resilient link making it possible to compress the two pivots to bring them closer together and engage them in the two bearings of the side-piece, the trim being installed by introducing the pivot of the flexible lug into its bearing, then compressing the flexible lug in order to introduce the other pivot into its bearing, and finally pivoting the trim about the axis thus produced by the two pivots and the two bearings in order to clip the clipping-in device of the trim into the clipping-in element of the side-piece, defining the assembly position of the trim.

This embodiment of the trim is particularly simple to install, since after having engaged a pivot in its bearing, in order to shorten the distance between the pivots and permit the introduction of the second pivot into its bearing, the flexible limb is compressed at its junction with the body of the trim, which forms a resilient link, in order to gain length until the second pivot is brought into its bearing.

Then, the trim naturally reassumes its state when the compression is relaxed. The trim can in this case also pivot about the axis formed by the two pivots in order to engage the clipping-in element in the clipping-in device.

In order to disengage from the clipped-in connection, it is sufficient to push on the trim through the opening of the side-piece of the spectacles, then disengage the two pivots by carrying out in reverse order the movements described above.

Advantageously, the side-piece of the spectacles has near its hinge a pivot and a clipping-in element, and the flexible lug carrying one of the pivots of the trim also carries the clipping-in device of the trim, the other end of the trim having the second pivot.

According to another advantageous feature, the bearing and the clipping-in element of the side-piece are made in one piece.

The pivot forms an element for fixing and occasionally for pivoting or rotation, at the moment when the trim is installed or is removed. This pivoting is perfectly possible, even if the pivot has a non-circular cross-section, for example if the trim is cut out from a sheet of rigid material, for example of plastics material or metal, the square cross-section of the pivot then being able to rotate perfectly in the cylindrical bore of circular cross-section of the bearing.

According to another feature, the two pivots and the clipping-in device are formed by parts of the strip of material from which the trim is produced.

Thus the same applies to the clipping-in device which forms part of the trim.

According to another feature, at least one of the fixing elements is a gusset on the rear face of the side-piece and at least one of the fixing devices at one of the ends of the trim is provided by two lugs deforming resiliently in the gusset by compression in the longitudinal direction in order to allow the introduction of the other fixing device at the other end of the trim into its fixing element of the side-piece.

According to another feature, the side-piece has two fixing elements in the form of a gusset on the rear face of the side-piece and the two fixing devices of the trim are each provided by two lugs resiliently deformable by compression in the longitudinal direction.

This embodiment of the fixing elements and of the fixing devices permits very simple and very efficacious installation of the trim on the side-piece. It is installed by acting on the resilience of the two lugs even in the case of a trim that is very rigid, for example owing to its particular shape, the ribs and the decoration which the trim may bear.

For some types of decoration or structure of the trim, it is desirable not to arch the trim resiliently, but to maintain its shape (flat or naturally slightly curved), according to the shape of the side-piece to which it adapts. To deform a trim resiliently beyond its natural shape may ruin the elements of decoration, for example by creating cracks in the film covering the trim, or detach the elements added on to the front face of the trim.

The seating in the form of a gusset provided at least at one of the ends of the spectacle side-piece to receive the fixing device in the form of resilient lugs of the trim makes it possible to place the trim very flat against the rear face of the side-piece, by positioning first the end equipped with the resilient lugs in the gusset then, by pushing on that end to deform the two limbs resiliently and allow the other end of the trim, i.e. the fixing device of the other end of the trim, to pass into its fixing element, for example a gusset similar to that of the other end; then by releasing the end having the resilient lugs which have been compressed, the trim fits definitively in place while remaining detachable.

The fixing elements in the form of a gusset may be very flat so as to form substantially no relief on the inner face of the side-piece. These elements in the form of a gusset may even be incorporated in the rear face of the side-piece.

According to another advantageous feature,
the opening is bordered, on the inner face side of the side-piece, by a rebate,
the fixing elements are each formed by a seating bordering the opening, in the sheared edge, on the inner face side, level with the inner side of the rebate bordering the opening,
the two seatings are opposite each other, one of the seatings being at the front and the other at the rear side of the side-piece, and at least one of the seatings including a piston loaded by a spring,
the trim has an edge intended to bear through the inside of the opening against the rebate,
the fixing devices of the trim are each in the form of a lug prolonging the edge and intended to slide into the complementary seating of the opening, one of the lugs engaging in the seating equipped with the piston, in order to push the piston back against the action of the spring until the other lug can be brought opposite the other seating, the release of the thrust exerted on the trim, in the opposite direction to the action of the spring of the piston, pushing back the whole of the trim in order to introduce the second lug into its seating and lock it.

The trim is introduced in a particularly simple manner into the opening in which it can lock. Any thrust exerted against the outer face of the trim is blocked. Only a translational movement exerted on the trim parallel to the side-piece so as to compress the piston makes it possible to disengage the other lug from its seating and extract the trim in order to replace it, and change the trim to modify the color or the decoration.

Since this movement is not natural and in particular cannot be brought about accidentally, this substantially excludes any risk of loss of the trim, especially since the trim is placed in position from the inner side of the spectacle side-piece.

According to another advantageous feature, the trim has a domed shape corresponding to the opening of the side-piece, the domed shape being provided with the edge so that the domed part lodges in the opening and the edge bears against the rebate.

The domed shape of the trim is provided with a sufficiently wide edge to permit the translational movement serving for the installation of the trim in the opening without the respective dimensions of the opening and of the domed shape interfering with the translational movement of the trim in order to introduce the lugs.

DRAWINGS

The present invention will be described in more detail hereinafter by means of different embodiments shown in the appended drawings, in which:

FIGS. 9A-9C show diagrammatically the three stages of installation of a trim end in the fixing element of the side-piece; in these figures, the gusset forming the fixing element is shown sectioned through a plane parallel to the rear face of the side-piece:

DESCRIPTION OF EMBODIMENTS OF THE INVENTION

Figures 1A, 1B:
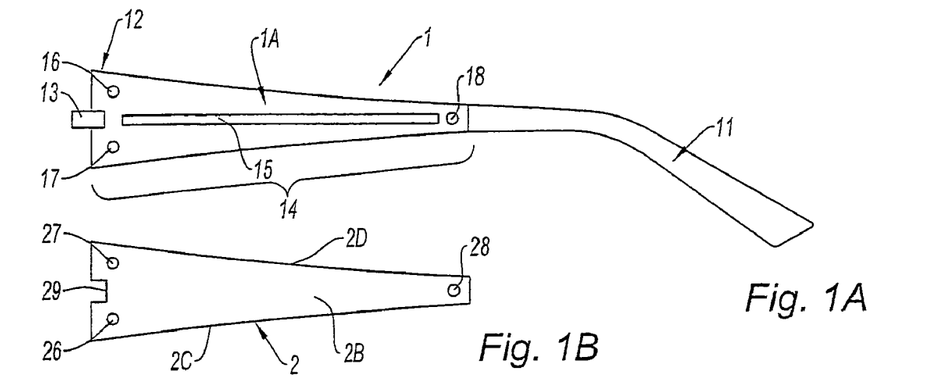
FIGS. 1A, 1B respectively show a view from the inner side of a wide spectacle side-piece and of a trim intended for the wide side-piece.

According to FIGS. 1A, 1B, the invention concerns a pair of spectacles with wide side-pieces. Only one side-piece 1 of the spectacles is represented, showing its inner side 1. A wide side-piece has a shape increasing from the rear end 11, fitting over the ear, to the front end 12 at the hinge member 13 connected to the front part of the spectacles.

The wide side-piece 1, relatively flat in its wide part 14, includes an opening 15 formed here by an elongate slot extending over the whole length of the wide part.

At the front and on each side of the opening 15, the wide part 14 is equipped with two fixing elements 16, 17. At the rear of the opening 15, it has a third fixing element 18.

The fixing elements 16, 17, 18 are intended to receive a trim 2 as shown in FIG. 1B, equipped with fixing devices 26, 27, 28 complementary to the fixing elements 16, 17, 18 in order to co-operate with the latter and hold the trim of FIG. 1B pressed against the inner side 1A of the wide side-piece 1, so as to appear through the opening 15 of the latter.

According to FIG. 1B, the trim 2 showing its outer face 2B intended to cover at least partially, and here completely, the opening of the wide side-piece by fitting against the inner side of the latter, has a triangular shape, the vertex of which is truncated. The dimensions of the trim 2 are here larger than the dimensions of the opening 15 and, in particular, the upper edge 2C and the lower edge 2D of the trim; FIG. 1B shows the outer face 2B of the trim 2 intended to fit against the inner side 1A of the wide side-piece 1. Besides the fixing devices, the trim has a cutaway portion 29 so as to straddle the hinge element 13 while co-operating with the hinge element and thus constituting a locking means completing the hold provided by the co-operation of the elements 16, 17, 18 and of the fixing devices 26, 27, 28.

The fixing elements and devices 16, 17, 18; 26, 27, 28 in this embodiment are formed by clipping-in means: the fixing elements 16, 17, 18 are seatings, preferably not of the through type, provided in the wide side-piece 1, and the fixing devices 26, 27, 28 are clip-in pins, carried by the trim 2. The clip-in pins can be made from the material of the trim if the latter is made of a plastics material or, more generally, a molded part. The clipping-in devices may also be welded to the trim or be inserted into seatings of the trim by a shrink fit so as to be firmly fixed therein.

These clipping-in means permit a detachable connection of the trim 2 against the inner face 1A of the side-piece 1.

The outer face 2B of the trim 2 has decorative elements intended to appear through the opening of the wide side-piece. The decorative elements may be a flat or relief decoration at the opening. According to a particularly advantageous embodiment, the trim 2 is made of metal, treated, brushed, guilloched, dyed. The trim advantageously incorporates functional elements such as an electronic radio or telephone circuit or an information technology support and especially means working by WIFI.

Very advantageously, the trim may include an identification chip such as an RFID card, allowing a spectacle wearer to pass through control points, for example of the protected office or business zones to which he could gain access only with a separate badge, for example of the RFID type. This combination of the RFID badge and the spectacles means that he always has the badge on him, without having to concern himself about it.

Figures 2A, 2B:
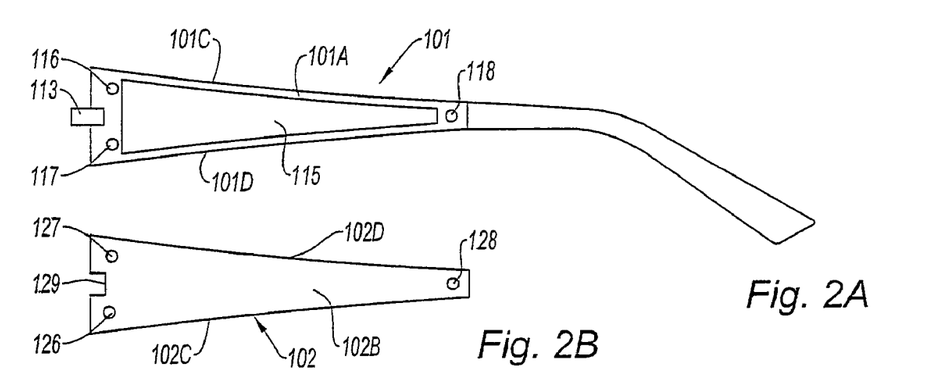
FIGS. 2A, 2B are views corresponding to the preceding figures of another embodiment of a wide spectacle side-piece and a trim.

FIGS. 2A, 2B show another embodiment of spectacles with wide side-pieces according to the invention, being limited as previously to a wide side-piece 101 seen from its inner side 101A.

The wide side-piece 101 has an elongate opening 115 of triangular shape according to the contour of the wide side-piece. The trim 102 intended for this opening 115 also has a triangular shape like that of FIG. 1B with substantially the same fixing means 126, 127, 128, i.e. connecting devices and a notch 129 to permit the straddling of the hinge element 113 carried by the wide side-piece 101. The assembly means may be clipping-in means as before. By way of example, three points 116, 117, 118; 126, 127, 128 of the detachable connection are shown both on the inner side 101A of the side-piece 101 and on the outer side 201A of the trim 201 fitting against the inner side 101A of the trim 101 when the trim is in place on the side-piece.

Figures 3A, 3B:
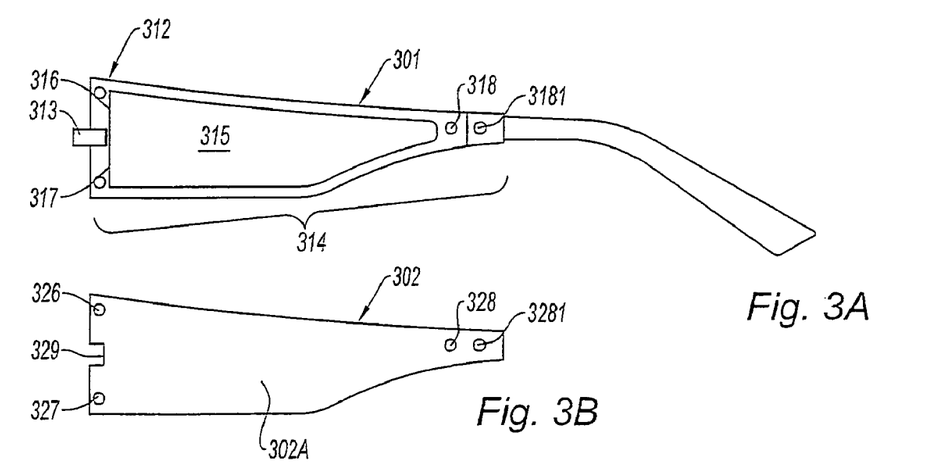
FIGS. 3A, 3B show a third alternative embodiment of spectacles with wide side-piece and of a trim in the assembly position.

FIGS. 3A, 3B show another variant of spectacles with wide side-pieces according to the invention. In this case, the wide side-piece 201, at its front part 312 and its wide part 314, has a substantially trapezoid contour with an opening 315 also of trapezoid shape. This opening is large. The trim 302 intended to cap the opening 315 is shown in FIG. 3B, in its assembly position, i.e. showing the inner face 302A.

In view of the dimensions of the opening 315 and, consequently, those of the trim 302, it is advantageous to effect the detachable assembly of the trim 302 and of the side-piece 301 by means of four fixing points, two fixing points at the front 316, 317; 326, 327 completed by the duplication of the fixing point at the rear, the two fixing points 318, 3181; 328, 3281 being placed one behind the other. The trim 302 also includes a cutaway portion 309 for straddling the hinge element 313 of the side-piece 301.

As before, the trim 302 can be made of any material whatever, preferably of metal. Its outer, decorative face, is treated with colors.

FIGS. 4A-4E show another embodiment of spectacles with wide side-pieces according to the invention. The principle of the wide side-piece 401 with an opening 415 intended to be occupied at least partially by a trim 402 fixed against the inner side 401A of the side-piece 401, is maintained, but the detachable fixing means for the trim are modified.

Figures 4A, 4B:
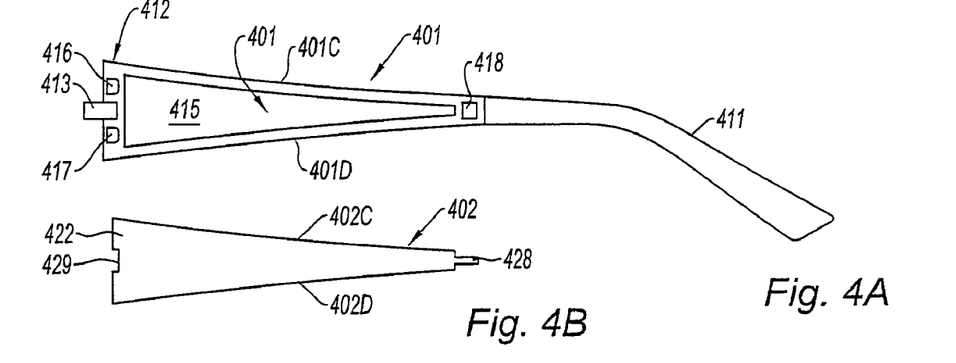
FIGS. 4A, 4B show another alternative embodiment of a wide spectacle side-piece and its trim with another method of fixing.

Thus, according to FIG. 4A, the front 412 of the wide side-piece 401, the opening 415 of which is triangular in shape, includes two lugs 416, 417 curved towards the rear 411 where the fixing point 418 is formed by a loop or a seating.

The trim 402 of FIG. 4B intended to equip the flat side-piece 401 of FIG. 4A has a shape larger than the shape of the opening 415 and in particular a shape such that its upper contour 402C and its lower contour 402D correspond to the upper contour 401C and lower contour 401D of the wide side-piece 401.

The rear end of the trim 402 is equipped with a tongue 428 intended to engage in the loop 418 of the wide side-piece 401, the front end 42 of the trim fitting beneath the two lugs 416, 417 and, for this purpose, the trim 402 has a length when flat which substantially corresponds to the distance between the front and rear fixing devices 416, 417, 418. Thus, the trim is installed by deformation, in order to be able to fit into the lugs turned towards the rear. This trim includes a cutaway portion 429 to straddle the articulation element 413.

Figure 4C:
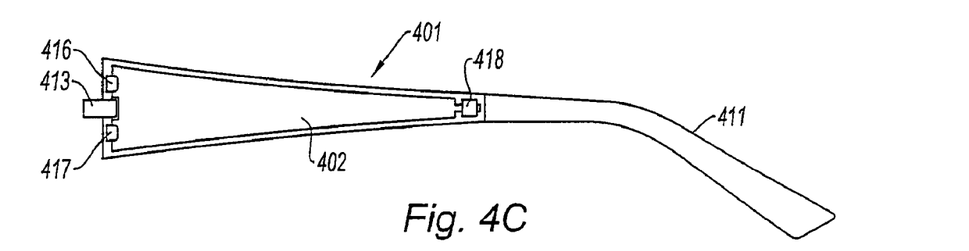
FIG. 4C is a view of the inner face of the side-piece with the trim installed.

FIG. 4C shows the inner side of the side-piece 401 equipped with its trim 402.

Figure 4D:
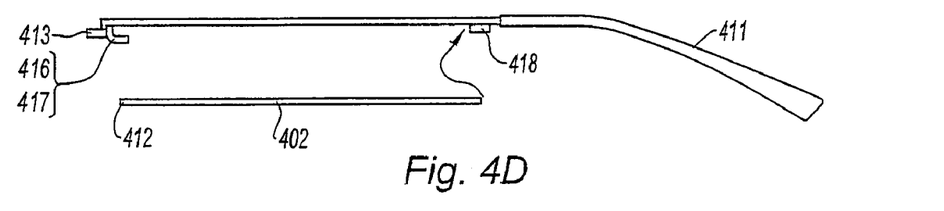
FIG. 4D is a view from above of the wide side-piece and of the trim before installation.

FIG. 4D shows more particularly the shape of the loop 418 and that of the front lugs 416, 418 forming hooks.

Figure 4E:
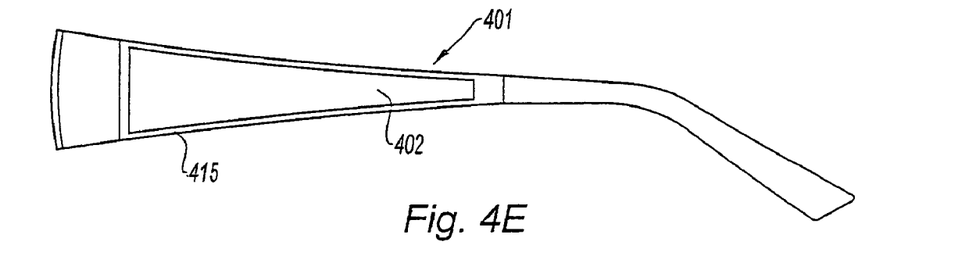
FIG. 4E is a view from the outer side of the wide side-piece of FIG. 4A, equipped with its trim according to FIG. 4B, FIGS. 5A-5C show another embodiment of a spectacle side-piece and its trim.

Finally, FIG. 4E shows the external appearance of the trim seen through the opening 415 of the wide side-piece 401.

FIGS. 5A-5C and 6A-6D show another embodiment of a wide side-piece 501 equipped with a trim 502.

Figure 5A:
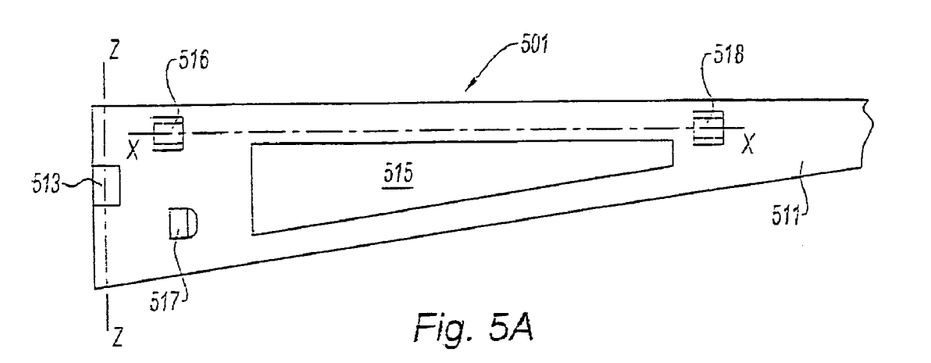

According to FIG. 5A, the wide side-piece 501 includes a hinge element 513 for pivoting about the axis zz in relation to the front of the mount. The inner face of the side-piece 501 carries three fixing elements, i.e. two bearings 516, 518 aligned along the axis xx and a third fixing element 517 formed by a clipping-in element.

The side-piece 501 has an opening 515, the upper edge of which is shown beneath the axis xx, without this geometric arrangement however being a necessity.

Figure 5B:
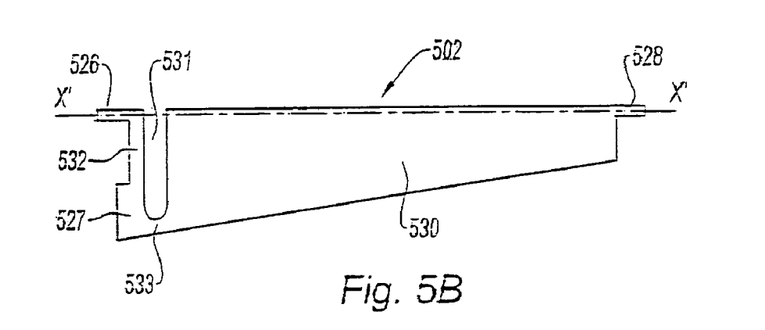

The trim 502 intended to equip the side-piece 501 has a shape which, in this example, covers the opening 515 of trapezoid shape of the side-piece 501.

The trim 502 has two fixing devices 526, 528 formed by two pivots aligned along the axis x'x' which, when the trim 502 is installed on the side-piece 501, will coincide with the axis xx under the conditions described hereinafter.

The trim 502 includes a third fixing device 527 formed by a clip-in edge intended to co-operate with the clipping-in element 517 of the side-piece 501.

The body 530 of the trim includes a cutaway portion 531 intersecting the axis x'x' and forming a flexible lug 532 through the portion of material 533 which connects it to the body 530.

The free end of the flexible lug 532 carries the pivot 526 and the end of the lug located close to the connecting portion 533 carries the clipping-in device 527.

The trim 502 is installed on the side-piece 501 by the engagement of the pivots 526, 528 in the bearings 516, 518 then clipping of the clipping-in device 527 in the clipping-in device 517.

Figure 5C:
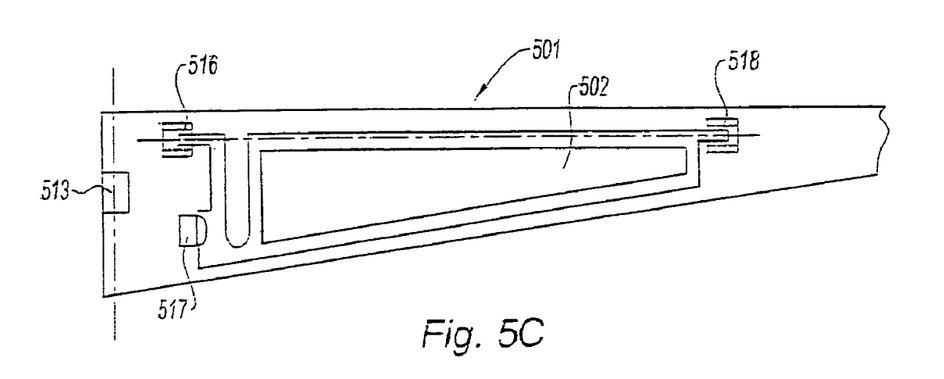

Once the trim 502 is installed, the inner face of the side-piece 501 appears as shown in FIG. 5C. The trim 502 totally or partially covers the opening 515. In this example, the opening 515 has a trapezoid shape and the body 530 of the trim 502 also has a trapezoid shape of larger dimensions than those of the opening 515. However, this geometric relationship is not a necessity. Depending on the effect or the result to be obtained, there will be a trim and an opening which will overlap each other partially or totally.

The installation and the removal of the trim occur as appears in FIGS. 6A-6D.

Figure 6A:
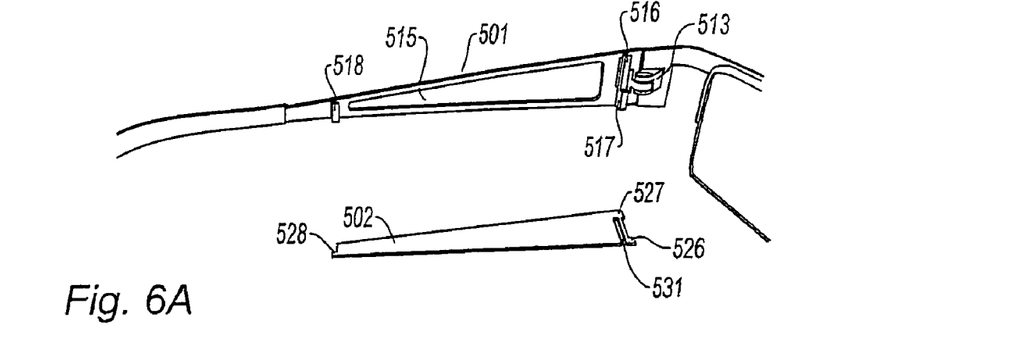
FIGS. 6A-6D show the different stages of the installation of the trim in the spectacle side-piece according to the embodiment of FIGS. 5A-5C, FIGS. 7A, 7B show another embodiment of a side-piece and a trim at the fixing element and at the fixing device.

According to FIG. 6a, the side-piece 501 of the head of the spectacles is to receive the trim 502.

In this example, the fixing element 516 forming a bearing and the fixing element 517 serving for clipping in are formed by a single part, in the shape of a small bar carried by the inner face of the side-piece 501. The trim is shown separately. It is formed by a piece cut out from a sheet, the fixing devices and the clip-in edge being produced during the same operation. The trim does not include decorative elements in this case.

It may be produced with decorative elements on the face appearing in the opening 515 of the side-piece and on the rear face.

Figure 6B:
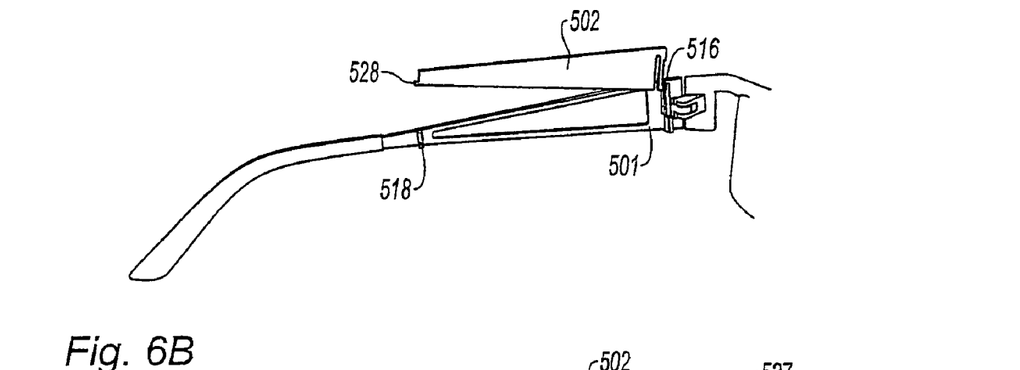

According to FIG. 6B, in a first operation, the pivot 526 is slid into its bearing 516 while holding the body 530 of the trim between the thumb and index finger. Once the pivot 526 is engaged, a push is exerted on the body 530 in the direction of the axis x'x' in order to bring the pivot 528 closer to the pivot 526 by deformation of the slot 531, until the pivot 528 is brought close enough to be able to engage in the bearing 518. Then the compression is relaxed so that the trim reassumes its natural state by the relaxation of the deformation of the connecting portion 533.

Figure 6C:
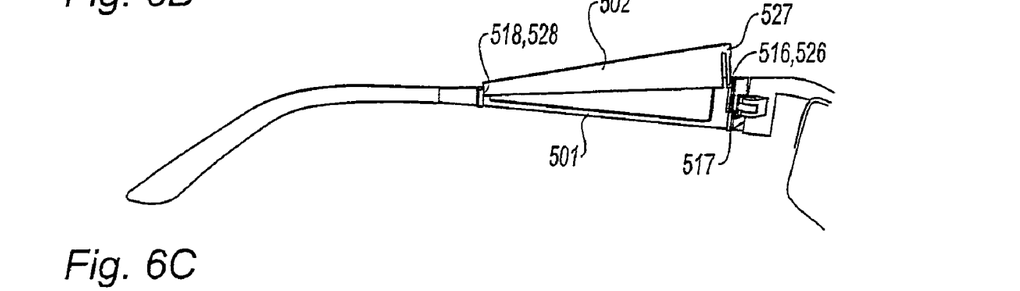
Figure 6D:
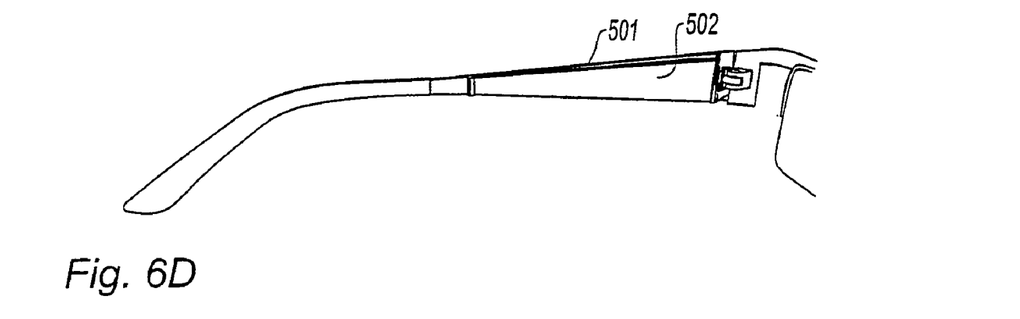

The trim then occupies the position shown in FIG. 6C. It can then be pivoted about the axis xx in order to pass the clipping-in device 527 beneath the clipping-in element 517. The trim 502 is thus held against the inner face of the side-piece 501 of the spectacles.

In order take out the trim 502 and replace it with another trim, it is sufficient to push through the opening 515, from the outer side of the side-piece 501, in order to disengage the clipping-in device 527 from the clipping-in element 517 and to pivot the trim about the pivot axis xx. When the trim 502 is lifted up as shown in FIG. 6C, it can be grasped between the thumb and index finger and the flexible limb 532 compressed by deformation of the resilient connecting part 533 until the pivot 528 can be brought out of its bearing 518 of the side-piece of the spectacles (FIG. 6B). It is then sufficient simply to extract the other pivot 526 from its bearing 516.

Although the forms of embodiment of the wide side-piece shown in the above examples correspond substantially to a triangular shape, the invention is not limited to such a shape of wide side-piece. It applies generally to any spectacle side-piece provided with at least one opening, whether the opening is elongate or of another shape. A side-piece may also have a plurality of openings, only one or some of which receive(s) a trim covering them partially or totally.

The openings in the side-pieces may be symmetrical for the left-hand side-piece and the right-hand side-piece or may be dissymmetrical.

Finally, the spectacles may have side-pieces only one of which has one or more openings receiving trims.

Figure 7A:
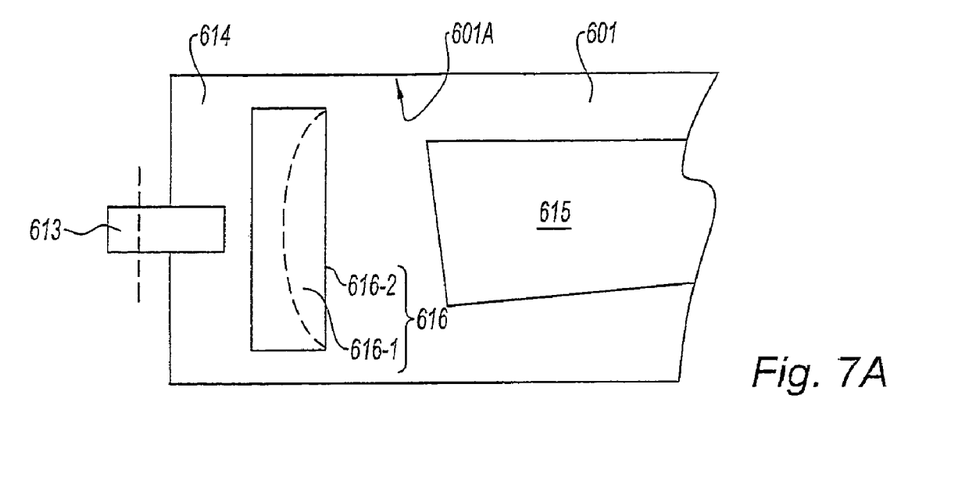
Figure 7B:
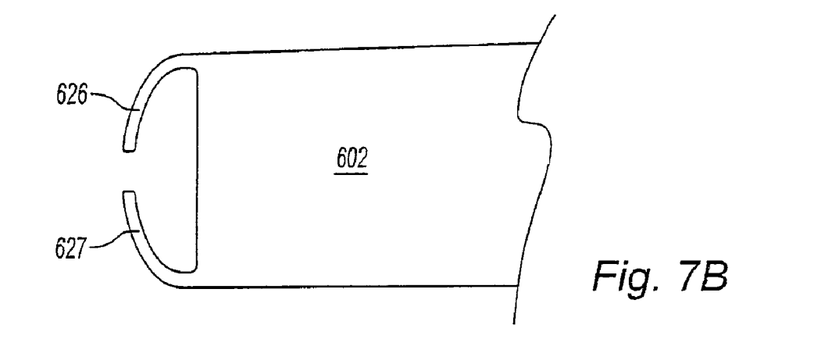

According to FIGS. 7A, 7B showing another alternative embodiment of spectacles with a variant of the fixing element 616 and of the fixing device: at one end 614 of the side-piece 601 and of the trim 602, the means for fixing the other end being similar or different.

According to FIG. 7A, the spectacle side-piece 601 includes, at one of the ends 614 (here the front end) on its inner face 601A, a fixing element 616 in the form of a gusset represented by a rectangle, but the contour of which is incorporated in the rear face of the spectacle side-piece. This element, in the form of a gusset located close to the hinge 613 of the side-piece 601, receives the corresponding end of the trim in its seating 601-1, the opening 616-2 of which is turned towards the other end of the side-piece 601.

According to FIG. 7B, the fixing device of the trim is formed by two resilient lugs 626, 627 in prolongation of the trim. These resilient lugs, which are curved and turned towards each other, can be deformed by compression in the direction (A) of their introduction into the seating 616-1 of the gusset 616.

The means for fixing the other end of the spectacle side-piece 601 and of the trim 602 are formed for example by a seating in the form of a gusset into which a lug of the end of the trim is introduced.

The trim 602 has on its face covering the opening 615 of the side-piece 601, decorative elements intended to appear in this window. The decorative elements are not shown.

Figure 8:
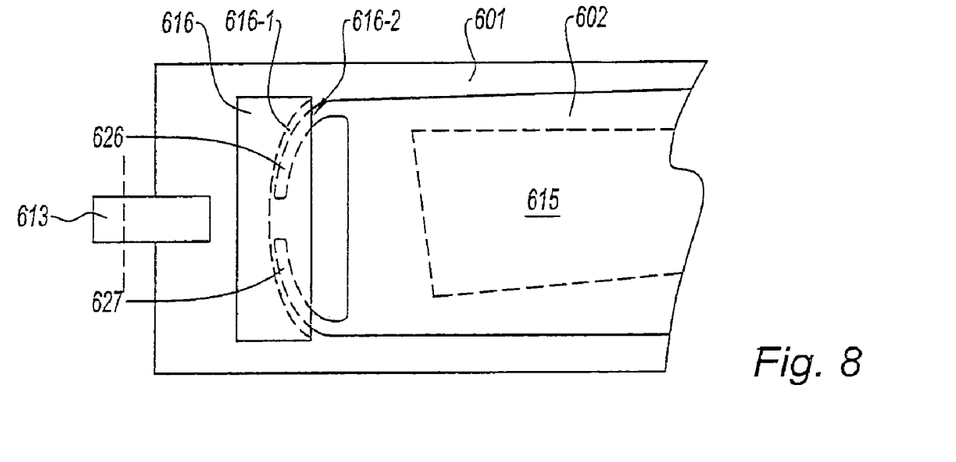
FIG. 8 shows the assembly of the end of the trim at the end of the side-piece according to FIGS. 7A-7B with engagement of the fixing device in the fixing element.

FIG. 8 shows the position of the fixing element 613 and of the fixing device 626, 627 of the trim 602, engaged in each other, showing the rear face 601A of the side-piece 601 and the rear face of the trim 602.

Figure 9A:
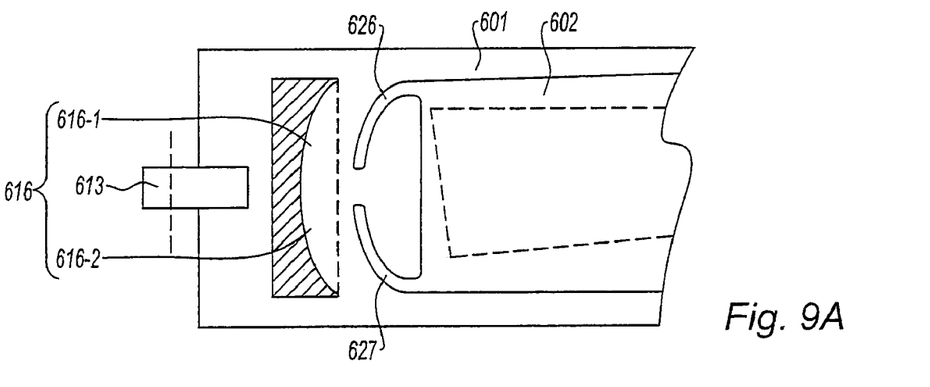
FIG. 9A shows the position of the fixing device in front of the fixing element before its engagement.
Figure 9B:
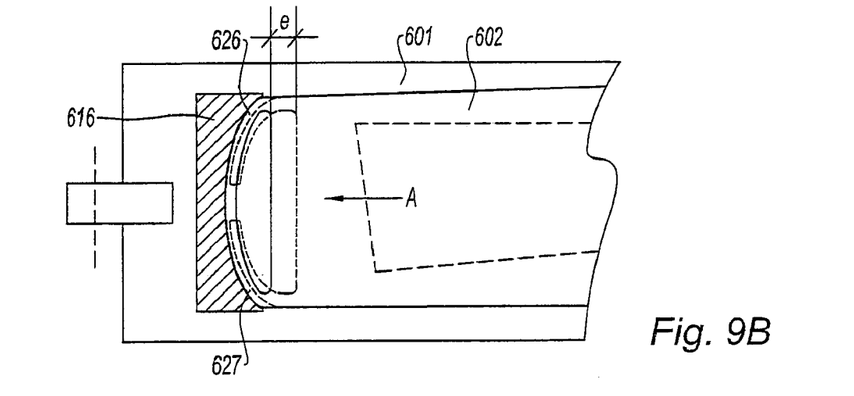
FIG. 9B shows the compression of the two lugs of the fixing device in the fixing element.
Figure 9C:
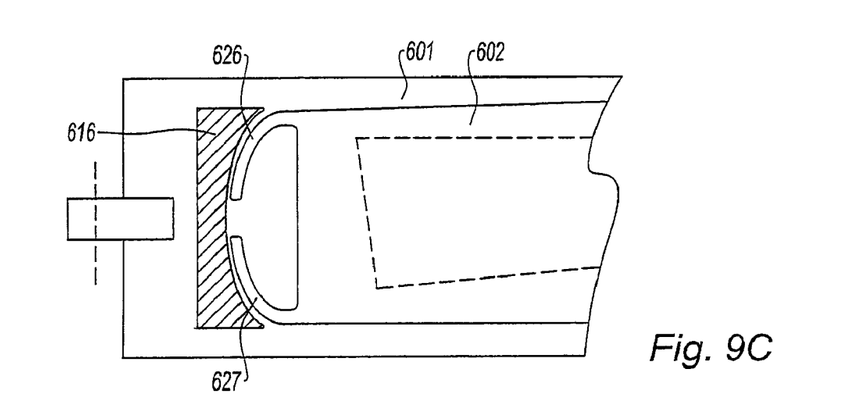
FIG. 9C shows the position of the fixing device of the side-piece after the resilient return.

FIGS. 9A-9C show the consecutive phases of engagement of the fixing device 626, 627 of the trim 602 in the fixing element 616 of the side-piece 601.

FIG. 9A shows the end of the trim 602 pressed flat against the rear face 601A of the side-piece 601 presented opposite the inlet 616-2 of the gusset 616 shown in section.

According to FIG. 9B, the end of the trim formed by the two resilient lugs 626, 627 is introduced by sliding them into the gusset 616 and then compressing them to deform them resiliently so as to feed the trim in the direction of the arrow A by the length (e) necessary for placing the other end of the trim in its corresponding fixing element of the side-piece (this part of the side-piece and of the trim is not shown). The compressed shape of the lugs 626, 627 against the bottom of the seating 616-1 is shown by solid lines, whereas the natural shape of the lugs 626, 627 is shown by dashed lines, making it possible to demonstrate the off-set of the distance (e) between these two positions corresponding to the resilient crushing and non-crushing of the lugs 626, 627 beneath the thrust in the direction A.

Then, once this other fixing device is placed in the fixing element, the thrust is relaxed on the resilient lugs 626, 627 of the trim 602 which reassume their normal shape or optionally still remain slightly compressed (FIG. 9C).

The trim 602 is thus detachably fixed to the side-piece 601 and covers the opening 602 shown by dotted lines without the risk of coming detached by itself from the side-piece 601. In order to remove it, it is necessary to carry out a movement the reverse of that for installation, i.e. starting from the position shown in FIG. 9C, the trim 602 must be pushed towards the left (arrow A) in order to compress the lugs 626, 627 resiliently in order to be able to disengage the other end of the trim 602 from the second fixing element. Then, once this end is removed, the end of the trim equipped with the two lugs is withdrawn from the seating 616-1 of the gusset 616.

The other end of the trim may also have a fixing device formed by a resiliently deformable portion, similar to the two lugs of the end which has just been described and lodging in a gusset of a shape corresponding to that of the gusset described above. This second end with a resilient fixing device makes it possible to hold the trim with a certain pre-stress in the two fixing elements of the side-piece 601, the dimensions being selected so that the fixing devices remain in a slightly compressed position. This makes it possible to compensate for any manufacturing tolerance which, even if it is very small, is likely to be perceived as annoying. This resilience of the two lugs also makes it possible to compensate for differences of expansion.

Figure 10A:
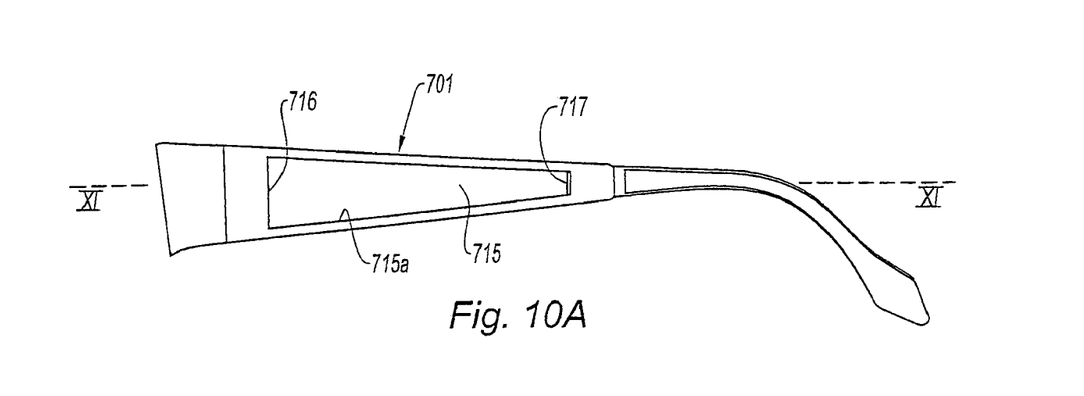
FIG. 10A is a side view of a spectacle side-piece according to another embodiment, the trim having been removed.
Figure 10B:
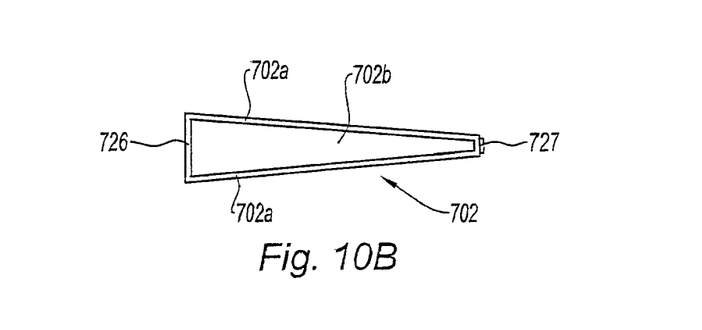
FIG. 10B is a front view, from the inner side of the trim intended for the side-piece of FIG. 10A, FIGS. 11A-11D show, in a horizontal section according to XI-XI of FIG. 10A, the installation of a trim in the spectacle side-piece.

According to FIGS. 10A, 10B showing another embodiment of a pair of spectacles, the side-piece 701 is equipped with an opening 715, of trapezoid shape here, and has a rebate 715a bordering the opening on all sides or at least over a large part thereof. At the front and at the rear of the opening, towards the inner face of the side-piece 701, there is a seating 716 forming a fixing element and a seating 717 equipped internally with a piston 718 loaded by a spring 719, forming the other fixing element, opposed to the first fixing element 716.

The trim according to FIG. 10B has a shape generally corresponding to that of the opening 715. This trim 702 has a central portion 702b and a peripheral edge 702a intended to fit into the rebate 715a of the opening 715.

The front end of the trim 702 is equipped with a fixing device 726 in the shape of a lug which extends the edge 702a. The rear end of the trim is equipped with a fixing device 727 also in the shape of a lug in prolongation of the edge 702a.

The structure of this embodiment will become clearer from the sectional views of FIGS. 11A-11D.

Figure 11A:
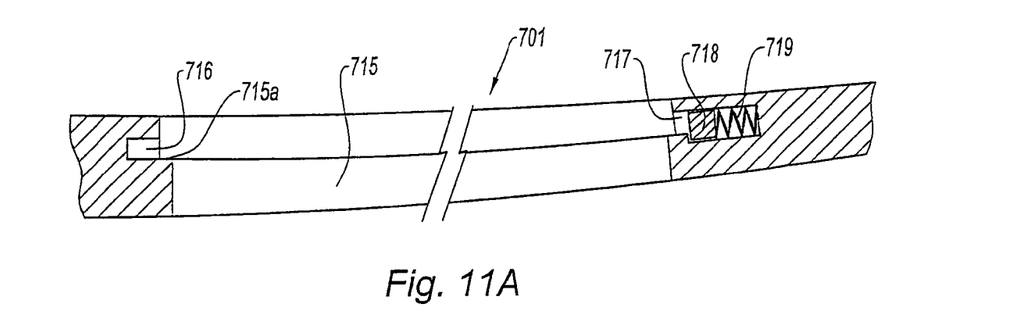
FIG. 11A shows the side-piece without the trim.

FIG. 11A shows the shape of the rebate 715a round the opening 715 with, at the front, the seating 716 and, at the rear, the seating 717, equipped with the piston 718 loaded by a spring 719 which pushes the piston towards the front. The piston is retained by means of the rim 717a of its seating 717, on the side directed towards the sheared edge of the opening 715.

The seatings 716, 717 are located on the inside of the side-piece 701, in the sheared edge of the opening 715, and they are substantially level with the rebate 715a.

Figure 11B:
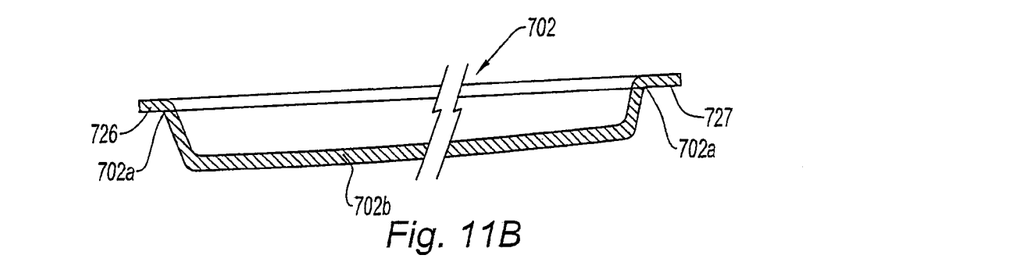
FIG. 11B is a corresponding section of the trim.

The sectional view of FIG. 11B shows an embodiment of a trim 702 having a central portion, for example domed 702b with a peripheral edge 702a terminated at each end by a lug 726 and 727.

Figure 11C:
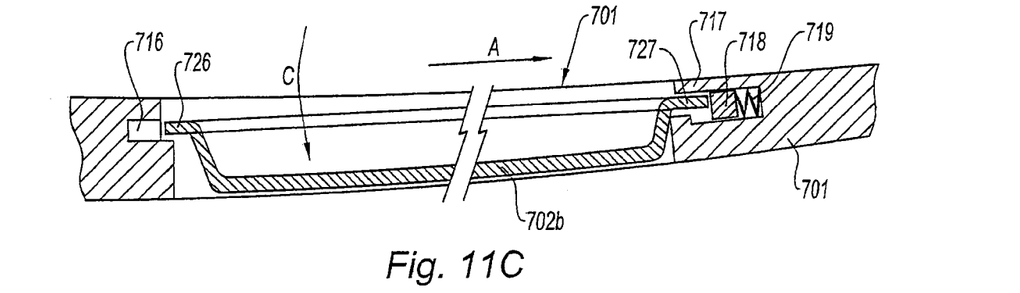
FIG. 11C shows the first movement for installation of the trim by compression of the piston.

The installation of the trim in the opening 715 of the side-piece 701 takes place as shown in FIG. 11C.

In a first movement, passing by the inside face of the side-piece 701, the lug 727 is introduced into the seating 717 by pushing the piston 718 back against the action of the spring 719 while acting in the direction of the arrow A until the end of the other lug 726 can be passed into the opening and be placed opposite the seating 716. At this moment, the thrust in the direction of the arrow A can be relaxed so that the spring 718, via the piston 717a, pushes back the lug 727 which thus pushes back the trim 702 and the lug 726 into its seating 716.

The movement for installation of the trim 702 consists in initiating the introduction of its lug 727 into the seating 717 by tilting the trim in the direction of the arrow C in order to place it in the opening 715, its edge 702a bearing against the rebate 715a. This support stabilizes the trim 702 and makes it easier to push it in the direction A in order to push back the piston 718. The other lug 727 can then bear against the rebate 715a in front of the seating 716. It is then possible to discontinue the thrust exerted on the trim, which moves back in the opposite direction to the direction A and the lug 726 engages in its seating 716.

Figure 11D:
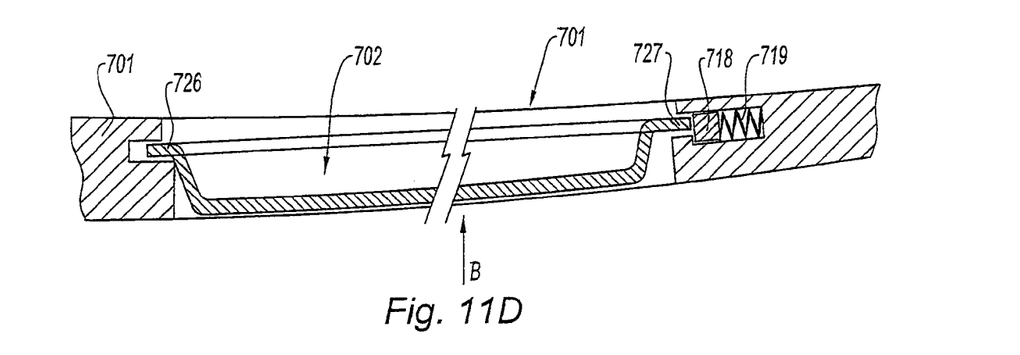
FIG. 11D shows the trim locked in the side-piece.

The position at the end of the installation movement is shown in FIG. 11D, which shows that the two lugs 726, 727 are locked in their seating and resist thrusts exerted in the direction B perpendicularly to the face of the side-piece. Whether this thrust is exerted from the outer side, which is in any case more frequent, or from the inner side of the side-piece 702, it can have no component of thrust in the direction A, not being likely to unlock the trim 702.

To remove the trim, it is necessary to proceed in reverse manner to the movement described above in FIG. 11C, by pushing the trim 702 back in the direction of the arrow A until the lug 726 is disengaged from the seating 717 then, with a pivoting movement in the opposite direction to the arrow C, the trim can be removed.

This extremely simple movement, permitting very effective locking of the trim, facilitates the changing of decoration or presentation of the spectacles. The spectacle user can thus have available a set of trims of colors or designs adaptable to different circumstances.

The invention claimed is:

1. Spectacles with wide side-pieces, at least one of the side-pieces of which has an opening receiving a decorative trim, characterized in that the inner face of the side-piece has:
    fixing elements bordering the opening and the fixing elements being formed by two curved lugs, at the front of the side-piece on the same side as the hinge, the lugs being directed towards the rear of the side-piece, and by a seating at the rear,
    a decorative trim having a shape at least partly equal to the opening of the side-piece, equipped with fixing devices complementary to the fixing elements in order to fix the trim detachably to the side-piece and to occupy at least partially the opening of the side-piece, starting from its inner face, the fixing devices being formed by a tongue engaging longitudinally in the seating of the side-piece and by the front edge of the trim which slides beneath the lugs curved towards the rear.

2. Spectacles according to claim 1, characterized in that the opening is elongate in shape and the trim is also elongate in shape and in particular the opening is triangular or trapezoid in shape and the trim is triangular or trapezoid in shape.

3. Spectacles according to claim 1, characterized in that the contour of the trim reaches to the upper edge and the lower edge of the side-piece.

4. Spectacles according to claim 1, characterized in that the wide side-piece has a plurality of openings, and fixing elements associated with at least one of the openings for receiving a trim intended to at least partially cover an opening.

5. Spectacles according to claim 1, characterized in that the fixing elements of the side-piece and the fixing devices of the trim are clipping-in means.

6. Spectacles according to claim 1, characterized in that
    the inner face of the side-piece carries fixing elements in the form of two bearings aligned on each side of the opening and also a clipping-in element not located on the axis of the two bearings, bordering the opening,
    the trim is equipped with fixing devices formed by two pivots aligned at each end of the trim, and a clipping-in device forming the third fixing point in order to cooperate with the clipping-in element of the side-piece.

7. Spectacles according to claim 6, characterized in that one of the pivots is carried by a lug disengaged from the body of the trim to which it remains connected by a strip of material forming a resilient link making it possible to compress the two pivots in order to bring them closer together and engage them in the two bearings of the side-piece, the installation of the trim being effected by the introduction of the pivot of the flexible lug into its bearing then compression of the flexible lug in order to introduce the other pivot into its bearing, and finally pivoting of the trim about the axis thus provided by the two pivots and the two bearings in order to clip the clipping-in device of the trim into the clipping-in element of the side-piece, defining the assembly position of the trim.

8. Spectacles according to claim 7, characterized in that the side-piece of the spectacles has near its hinge a pivot and a clipping-in element, and the flexible lug carrying one of the pivots of the trim also carries the clipping-in device of the trim, the other end of the trim having the second pivot.

9. Spectacles according to claim 8, characterized in that the bearing and the clipping-in element of the side-piece are made in one piece.

10. Spectacles according to claim 7, characterized in that the two pivots and the clipping-in device are formed by portions of the strip of material from which the trim is made.

11. Spectacles with wide side-pieces, at least one of the side-pieces of which has an opening receiving a decorative trim, characterized in that the inner face of the side-piece has:
    fixing elements bordering the opening and
    a decorative trim having a shape at least partly equal to the opening of the side-piece, equipped with fixing devices complementary to the fixing elements in order to fix the trim detachably to the side-piece and to occupy at least partially the opening of the side-piece, starting from its inner face, characterized in that at least one of the fixing elements is a gusset on the rear face of the side-piece and at least one of the fixing devices at one of the ends of the trim is formed by two lugs being deformed resiliently in the gusset by compression in the longitudinal direction in order to allow the other fixing device of the other end of the trim to be introduced into its fixing element of the side-piece.

12. Spectacles according to claim 11, characterized in that the spectacle side-piece includes two fixing elements in the shape of a gusset on its rear face and the two fixing devices of the trim are each formed by two lugs resiliently deformable by compression in the longitudinal direction.

13. Spectacles with wide side-pieces, at least one of the side-pieces of which has an opening receiving a decorative trim, characterized in that it comprises a rebate bordering the opening, on the inner face side of the side-piece, fixing elements each formed by a seating bordering the opening, in the sheared edge, on the inner face side, level with the inner side of the rebate bordering the opening, the two seatings are opposite each other, one of the seatings being at the front and the other at the rear of the side-piece, at least one of the seatings including a piston loaded by a spring and the other being free, fixing devices of the trim, each in the shape of a lug extending the edge and intended to slide into the complementary seating of the opening, one of the lugs engaging in the seating equipped with the piston, in order to push the piston back against the action of the spring until the other lug can be brought opposite the other seating, the release of the thrust exerted on the trim, in the opposite direction from the action of the spring of the piston, pushing back the whole of the trim in order to introduce the second lug into its seating and to lock the trim against the side-piece, an edge of the trim intended to bear through the inside of the opening against the rebate.

14. Spectacles according to claim 13, characterized in that the trim has a domed shape corresponding to the opening of the side-piece, the domed shape being provided with the edge so that the domed part lodges in the opening.

* * * * *